US 12,262,109 B2

(12) United States Patent
Kobayashi

(10) Patent No.: US 12,262,109 B2
(45) Date of Patent: Mar. 25, 2025

(54) IMAGE CAPTURING APPARATUS IMPROVED IN IMAGE RECOGNITION ACCURACY, METHOD OF CONTROLLING SAME, AND STORAGE MEDIUM

(71) Applicant: CANON KABUSHIKI KAISHA, Tokyo (JP)

(72) Inventor: Takashi Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 18/194,415

(22) Filed: Mar. 31, 2023

(65) Prior Publication Data

US 2023/0328358 A1   Oct. 12, 2023

(30) Foreign Application Priority Data

Apr. 11, 2022   (JP) ................. 2022-065203

(51) Int. Cl.
*H04N 23/611*   (2023.01)
*H04N 23/60*   (2023.01)
*H04N 23/667*   (2023.01)
*H04N 23/83*   (2023.01)

(52) U.S. Cl.
CPC ......... *H04N 23/611* (2023.01); *H04N 23/665* (2023.01); *H04N 23/667* (2023.01); *H04N 23/83* (2023.01)

(58) Field of Classification Search
CPC .. H04N 23/611; H04N 23/665; H04N 23/667; H04N 23/83; H04N 23/61; H04N 23/62; H04N 23/631; H04N 23/60; G06T 5/60; G06T 7/70; G06T 2207/20081; G06T 2207/20084; G06V 10/70
See application file for complete search history.

(56) References Cited

U.S. PATENT DOCUMENTS

| | | | |
|---|---|---|---|
| 2019/0204448 A1 | 7/2019 | Eki | |
| 2020/0007781 A1* | 1/2020 | Aoba | G06N 3/08 |
| 2021/0195128 A1 | 6/2021 | Hanada | |
| 2021/0289131 A1* | 9/2021 | Yadav | G06N 20/00 |
| 2022/0385809 A1* | 12/2022 | Kai | H04N 23/80 |
| 2023/0326164 A1* | 10/2023 | Kobayashi | H04N 23/617 |

FOREIGN PATENT DOCUMENTS

| | | |
|---|---|---|
| JP | 6697042 B2 | 5/2020 |
| JP | 6937443 B2 | 9/2021 |

* cited by examiner

*Primary Examiner* — Kelly L Jerabek
(74) *Attorney, Agent, or Firm* — Venable LLP

(57) ABSTRACT

An image capturing apparatus includes an image sensor section and a signal processor for processing an image input from the image sensor section via a signal line. A control arithmetic unit switches the image sensor section to a recognition mode or a learning mode. The image sensor section includes an image capturing section for generating an image, and a sensor recognition section for performing, in the recognition mode, recognition processing by inputting the image to a first learning model. The signal processor includes a recognition section for performing recognition processing by inputting the image to a second learning model. The image sensor section further includes a sensor learning section for updating, in the learning mode, the first learning model, based on a recognition result obtained by the second recognition unit and input from the signal processor, and an image generated by the image capturing unit.

17 Claims, 9 Drawing Sheets

*FIG. 4*

|  | RECOGNITION SECTION IN SENSOR | RECOGNITION SECTION IN SIGNAL PROCESSOR |
|---|---|---|
| RECOGNITION PERFORMANCE | LOW | HIGH |
| PARTIAL RECOGNITION | DETECTABLE IN MIDDLE OF IMAGE READING | DETECTION USING WHOLE IMAGE |
| RECOGNITION LAG | SMALL | LARGE |
| POWER CONSUMPTION | SMALL | LARGE |
| HEAT GENERATION | IMAGE SENSOR SECTION | IMAGE PROCESSOR |

IMAGE CAPTURING APPARATUS IMPROVED IN IMAGE RECOGNITION ACCURACY, METHOD OF CONTROLLING SAME, AND STORAGE MEDIUM

BACKGROUND OF THE INVENTION

Field of the Invention

The present invention relates to an image capturing apparatus that is improved in image recognition accuracy, a method of controlling the same, and a storage medium, and more particularly to an image capturing apparatus that performs recognition processing in each of an image sensor section and a signal processor, arranged therein, a method of controlling the same, and a storage medium.

Description of the Related Art

In an image capturing apparatus represented by a recent digital camera, there is a case where high-level recognition processing using a neural network based on machine learning, such as deep neural network (DNN), is performed by a signal processor to meet demands of diversified and high-speed image processing. Further, in such an image capturing apparatus, there is also a case where not only an image capturing section but also a recognition section is arranged in an image sensor section formed by a single chip, and image generation and image recognition are performed in the single chip to meet the above-mentioned demands.

For example, Japanese Patent No. 6937443 proposes an image sensor section formed by laminating an image capturing section and a recognition section using deep learning, on a substrate.

Further, Japanese Patent No. 6697042 discloses a technique for evaluating the recognition accuracy of the recognition section in such an image sensor section as described above and changing a learning model used by the recognition section according to the evaluated recognition accuracy. The learning model in Japanese Patent No. 6697042 is stored in a storage section in advance, and the number of types of objects as detection targets and the number of classification types are changed according to the evaluated recognition accuracy.

Incidentally, as mentioned in the beginning of the description, in an image capturing apparatus represented by a recent digital camera, a recognition section that performs image recognition processing is sometimes provided not only in the signal processor at a latter stage, but also in the image sensor section at a former stage. That is, the image capturing apparatus has two recognition sections, i.e. one in the image sensor section at the former stage and the other in the signal processor at the latter stage. Further, in general, compared with the image sensor section at the former stage, which is limited in circuit configuration, the signal processor at the latter stage, which is large in circuit scale, is capable of performing higher-level image processing. As one example, let us consider recognition of a specific object, such as a face. The signal processor at the latter stage can cope with image deterioration which reduces the recognition accuracy, by performing high-level correction processing as image processing and then performing recognition processing using the recognition section internally provided, and hence it is possible to obtain a recognition result with excellent accuracy. On the other hand, there is a problem that the image sensor section at the former stage is smaller in the circuit scale than the image processor at the latter stage, and hence has a difficulty in performing complicated image processing, so that the recognition accuracy is low. Further, the image sensor section is limited in circuit scale and in the number of learning models which can be stored in a internal recording section, and hence is capable of detecting a smaller number of objects and capable of classifying objects into a smaller number of classes, than the signal processor at the latter stage.

SUMMARY OF THE INVENTION

The present invention provides an image capturing apparatus that is capable of improving image recognition accuracy of an image sensor section at a former stage and smaller in circuit scale than a signal processor at a latter stage, and coping with a larger number of objects to be detected and classified, a method of controlling the same, and a storage medium.

In a first aspect of the present invention, there is provided an image capturing apparatus including an image sensor section and a signal processor configured to process an image input from the image sensor section via a signal line, including a switching unit configured to switch the image sensor section to one of a recognition mode and a learning mode, wherein the image sensor section includes an image capturing unit configured to generate the image, and a first recognition unit configured to perform, in the recognition mode, recognition processing by inputting the image to a first learning model, wherein the signal processor includes a second recognition unit configured to perform recognition processing by inputting the image to a second learning model, and wherein the image sensor section further includes a learning unit configured to update, in the learning mode, the first learning model, based on a recognition result which is obtained by the second recognition unit and is input from the signal processor, and an image generated by the image capturing unit.

In a second aspect of the present invention, there is provided a method of controlling an image capturing apparatus including an image sensor section and a signal processor configured to process an image input from the image sensor section via a signal line, including switching the image sensor section to one of a recognition mode and a learning mode, generating the image in the image sensor section, performing recognition processing in the image sensor section in the recognition mode by inputting the image to a first learning model, performing recognition processing in the signal processor by inputting the image to a second learning model, and updating, in the image sensor section in the learning mode, the first learning model based on a recognition result obtained by inputting the image input from the signal processor to the second learning model, and an image generated by the image sensor section.

According to the present invention, it is possible to improve image recognition accuracy of an image sensor section at a former stage and smaller in circuit scale than a signal processor disposed at a latter stage, and cope with a larger number of objects to be detected and classified.

Further features of the present invention will become apparent from the following description of exemplary embodiments (with reference to the attached drawings).

BRIEF DESCRIPTION OF THE DRAWINGS

FIG. 4 is a diagram showing comparison between a sensor recognition section that performs recognition processing in the image sensor section and a recognition section that performs recognition processing in the signal processor.

DESCRIPTION OF THE EMBODIMENTS

The present invention will now be described in detail below with reference to the accompanying drawings showing embodiments thereof.

A first embodiment of the present invention will be described below.

Figure 1:
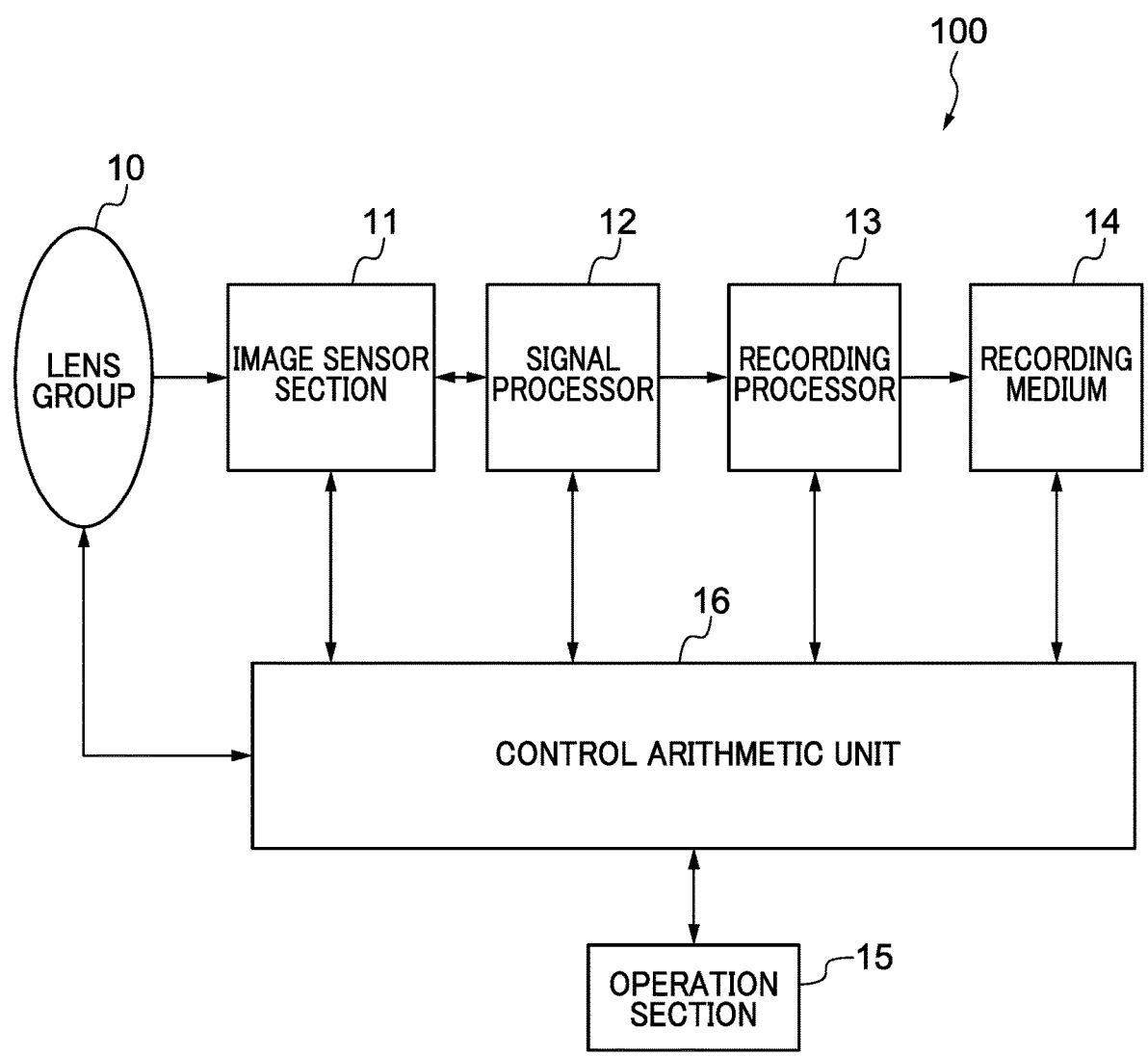
FIG. 1 is a schematic diagram showing a configuration of a digital camera as an image capturing apparatus according to a first embodiment of the present invention.

FIG. 1 is a schematic diagram showing a configuration of a digital camera 100 as an image capturing apparatus according to the present embodiment.

Referring to FIG. 1, the digital camera 100 includes a lens group 10, an image sensor section 11, a signal processor 12, a recording processor 13, a recording medium 14, an operation section 15, and a control arithmetic unit 16.

The lens group 10 represents a group of lenses that can be controlled so as to realize preferable image quality when an image is photographed by the digital camera 100. The lens group 10 includes a zoom lens, a focus lens, an image stabilization lens, a diaphragm, a neutral density (ND) filter, and so forth.

The image sensor section 11 receives a ray of light incident through the lens group 10 and performs photoelectrical conversion for converting light to an electrical signal in each of pixels on its imaging surface. Further, the image sensor section 11 converts the electrical signals obtained by photoelectrical conversion from analog to digital to thereby generate a digital image.

The signal processor 12 performs a variety of kinds of image processing on the digital image generated by the image sensor section 11. The image processing mentioned here refers to a variety of kinds of correction processing for realizing high image quality. Examples of the image processing include elimination of fixed pattern noise, demosaicing processing, development processing, brightness correction processing, color correction processing, geometrical deformation processing, edge emphasizing processing, gamma correction processing, contrast correction processing, aberration correction processing, and noise reduction processing. Further, the signal processor 12 performs not only the above-mentioned processing operations, but also recognition processing for detecting a main object area from an image, for the purpose of lens control, such as focusing and aperture control. Details of the processing operations performed in the image sensor section 11 and the signal processor 12, respectively, will be described hereinafter. The image on which image processing has been performed by the signal processor 12 is transmitted to the recording processor 13.

The recording processor 13 performs encoding on the image received from the signal processor 12 and transmits the encoded image to the recording medium 14.

The recording medium 14 may be a general-purpose recording medium which can be attached/removed to and from a general-purpose interface (not shown) included in the digital camera 100 or may be a storage device unremovably disposed in the digital camera 100 and having a fixed storage capacity. The recording medium 14 stores image data of encoded images transmitted thereto by writing the image data in a nonvolatile storage area.

The operation section 15 has receiving means for receiving an operation from a user on the digital camera 100 and transmitting means for transmitting an operation signal indicative of details of the received operation to the control arithmetic unit 16. The receiving means may be a mechanical button or an electrostatic capacitance-type touch panel integrally formed with a display member, such as a liquid crystal. Further, the receiving means may be an external remote controller connected to a general-purpose terminal or a communication device from an external terminal, such as a smartphone wirelessly connected to the digital camera 100.

The control arithmetic unit 16 receives an operation signal transmitted from the transmitting means of the operation section 15, generates control information, and transmits the generated control information to the lens group 10, the image sensor section 11, the signal processor 12, the recording processor 13, and the recording medium 14. In a case where the receiving means of the operation section 15 is a touch panel integrally formed with the display member, the control arithmetic unit 16 transmits control information for displaying an image on the display member to the operation section 15.

Now, there will be described a flow of signals in the entire system of the digital camera 100, which is related to an operation for performing auto focusing by a switch 1 (SW1) state, referred to hereinafter, as a preliminary stage of a still image photographing by the digital camera 100. Not that in the following example, it is assumed that a release button is included in the receiving means of the operation section 15.

When half-pressing of the release button is detected, the operation section 15 transmits half-pressing information to the control arithmetic unit 16. When the half-pressing information is received from the operation section 15, the control arithmetic unit 16 determines that the digital camera 100 is in the SW1. In the SW1 state, to perform an operation of focusing on an object at maximum speed, it is necessary to obtain a brightness suitable for the focusing operation. Therefore, the control arithmetic unit 16 calculates correction values for correcting a control position of the diaphragm, exposure time, and brightness, so as to obtain brightness suitable for the focusing operation, and transmits the associated correction values to the lens group 10, the image sensor section 11, and the signal processor 12, respectively.

The signal processor 12 detects a position of a main object from each of sequentially captured images, calculates object coordinates and contrast information at coordinates around the object coordinates (hereinafter referred to as the "near-object contrast information"), and transmits the calculated information to the control arithmetic unit 16.

The control arithmetic unit 16 determines a degree of focusing in the vicinity of the object coordinates based on the near-object contrast information transmitted from the signal processor 12, generates focus control information according to the determined degree of focusing, and transmits the generated focus control information to the lens group 10 a plurality of times. The control arithmetic unit 16 performs image capturing whenever the focus lens included in the lens group 10 is driven according to transmission of the focus control information and causes the signal processor 12 to calculate the near-object contrast information for each captured image. The control arithmetic unit 16 determines whether or not the focus lens has reached an in-focus position based on the near-object contrast information calculated by the signal processor 12. If it is determined that focus lens has reached the in-focus position, the control arithmetic unit 16 issues a command for stopping the focus lens to the lens group 10 and prepares for a shift from an operation in the SW1 state to an operation in a switch 2 (SW2) state. Further, the control arithmetic unit 16 generates control information for the lens group 10, the image sensor section 11, and the signal processor 12, so as to change the brightness for the focusing operation to a brightness for still image photographing.

The description has been given of the general configuration and operation of the digital camera 100. Next, the internal operations of the image sensor section 11 and the signal processor 12 will be described.

Figure 2:
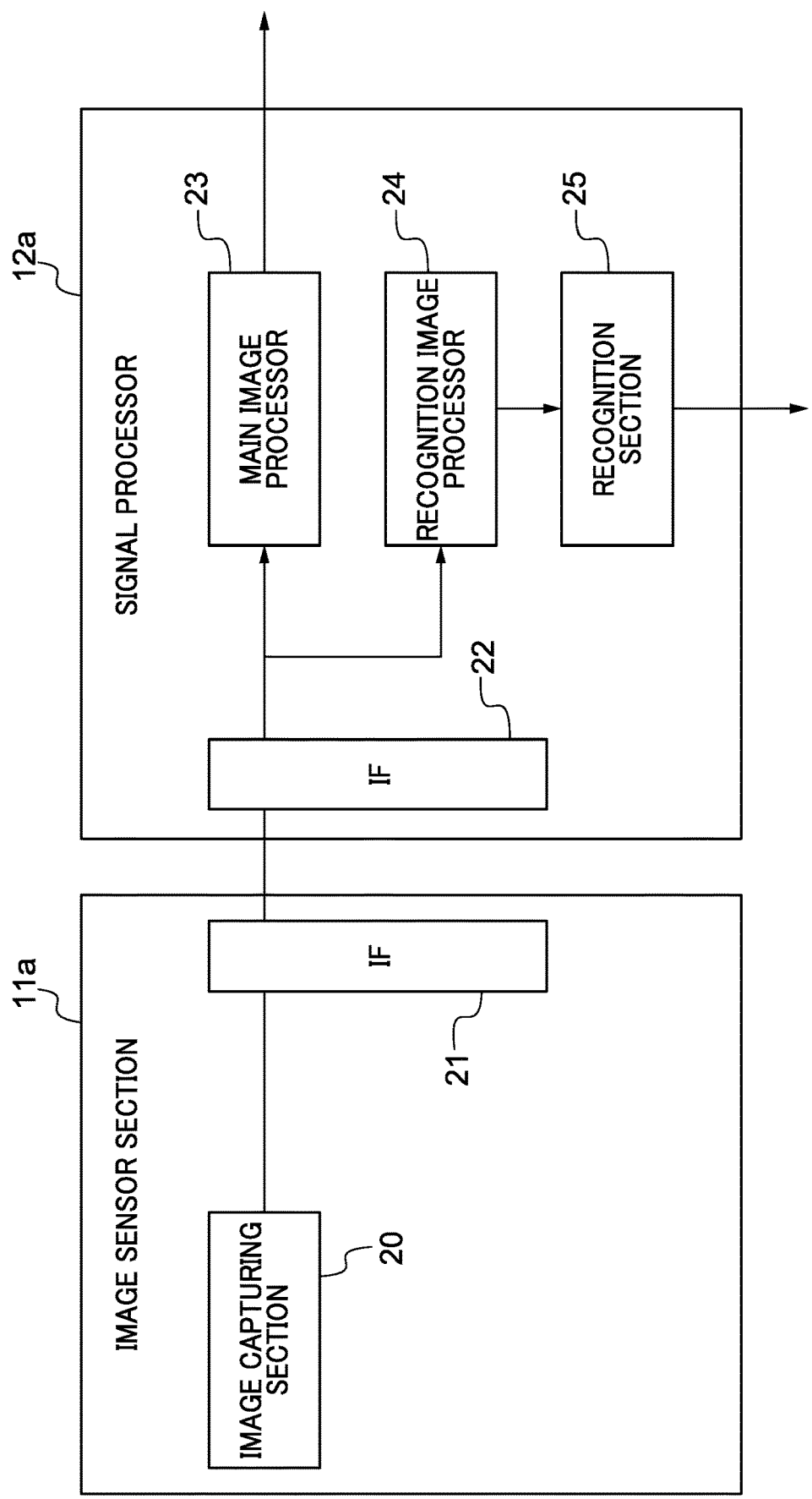
FIG. 2 is a diagram showing a data flow inside the conventional image sensor section and signal processor.

First, an image sensor section 11a and a signal processor 12a as the conventional components, which are arranged in the same positions as the image sensor section 11 and the signal processor 12 appearing in FIG. 1, will be described with reference to FIG. 2. FIG. 2 shows a data flow inside the conventional image sensor section 11a and signal processor 12a.

The image sensor section 11a includes an image capturing section 20 and an interface (IF) section 21. Further, the signal processor 12a includes an IF section 22, a main image processor 23, a recognition image processor 24, and a recognition section 25.

The image capturing section 20 (image capturing unit) in the image sensor section 11a photoelectrically converts received light to electrical signals and further converts the electrical signals from analog to digital to generate a digital image. The digital image output from the image capturing section 20 is transmitted to the IF section 22 in the signal processor 12a via the IF section 21. Here, the IF sections 21 and 22 may use general communication standards, such as low voltage differential signaling (LVDS) or sub LVDS, or may use any other special communication standards specific to the component elements. Further, although FIG. 2 shows an example in which communication between the IF sections 21 and 22 is performed via one signal line, image signals may be communicated in parallel at high speed via a plurality of signal lines.

The main image processor 23 in the signal processor 12a performs image processing on the image output from the image sensor section 11a to generate an image to be output to the recording processor 13. The image processing mentioned here includes a variety of kinds of image processing for converting an image in the Bayer array to an image which can be generally recorded and viewed. For example, the image processing includes processing for eliminating fixed pattern noise, demosaicing processing, color correction processing for adjusting the RGB balance, and gamma correction processing adapted to a gamma characteristic of a display device. Further, an object image captured through the lens group 10 is sometimes degraded in image quality due to characteristics of the lenses. In general, examples of the degradation include distortion aberration in which a peripheral portion is distorted, chromatic aberration in which a color shift occurs in a radial direction, and decrease in marginal illumination due to lens vignetting. The image processing mentioned here also includes processing for correcting these degradations of image quality according to the lens status when performing photographing. The distortion aberration can be corrected by performing geometrical deformation, while the chromatic aberration can be corrected by restoring each pixel by a color shift amount, and the decrease in marginal illumination can be corrected by amplifying an image signal in a concentric direction. Further, the image processing mentioned here can also include correction processing for emphasizing object edge, noise reduction processing for reducing random noise, and so forth, so as to improve the quality of the image. The image subjected to these image processing operations is output to the recording processor 13 arranged at a latter stage.

On the other hand, in order as to generate an image to be output to the recognition section 25 that performs recognition processing, the recognition image processor 24 (image modification unit) arranged in parallel with the main image processor 23 performs image processing operations similar to those performed by the main image processor 23 on the image output from the image sensor section 11a to modify the image. However, in an object or scene to be recognized by the recognition processing, there is sometimes a brightness or gradation which makes it easy to perform recognition. For example, a black animal or the like tends to be increased in recognition accuracy by correcting the brightness to some extent, but on the other hand, a face of a person or the like tends to be lowered in a recognition rate if the light-dark contrast is low. For this reason, it is preferable that the recognition image processor 24 performs image processing operations different from those performed by the main image processor 23 according to a recognition target. The image processed by the recognition image processor 24 is input to the recognition section 25.

In the recognition section 25 (second recognition unit), a variety of kinds of recognition processing are performed. The recognition processing in the recognition section 25 may use a function of rule-based recognition, or a function of cascade recognition for sequentially recognizing a recognition target by weak discriminators connected in series (cascade-connected), or a function of performing recognition trained for a discrimination boundary in a feature space by machine learning. Further, the recognition processing in the recognition section 25 may use a function (of a second learning model) of discrimination using a neural network that has obtained coefficients of pooling layers by deep learning. In a case where the recognition section 25 performs object recognition, as a recognition target, there may be mentioned, by way of example, a specific object, such as a person, an animal, an artificial object, the sky, a road, or a signal, and an organ as part of the object, such as a hand, a leg, a skeletal outline, a head, or a pupil. Further, the recognition section 25 sometimes performs scene recognition for determining a type of scene in a captured image. Examples of a scene recognized by scene recognition include specific scenes which are frequently used, such as a day scene and a night scene, an indoor scene and an outdoor scene, sunset glow, a sports scene, and a portrait. Further, recently, there is an increase in cases where the recognition section 25 performs, as recognition processing, class classification of properties of an object, e.g. by determining whether an object is a person or an animal, whether an object is a male or a female, and whether a object is a child or an adult. This class classification also includes image classification for determining a type into which a main object in an image is classified, such as a person, an animal, a scene, a road, the sky, or a vehicle. As a result of these recognition operations, the recognition section 25 outputs a position of an object (coordinates within an image), presence/absence of an object, an identifier (ID) of a determined scene, an ID of a class of the object, and an ID of an image type, to the control arithmetic unit 16.

The digital camera 100 according to the present embodiment, which can switch the signal processor 12 between a recognition mode and a learning mode, will be described. More specifically, in the recognition mode, the digital camera 100 is capable of obtaining a recognition result using the recognition function, whereas in the learning mode, the digital camera 100 is capable of updating the recognition function (of a learning model) of the image sensor section 11.

First, the recognition mode will be described using a data flow inside the image sensor section 11 and the signal processor 12 appearing in FIG. 3. Note that the same internal components as those of the conventional image sensor section 11a and signal processor 12a in FIG. 2 are denoted by the same reference numerals, and redundant description is omitted. That is, out of the components shown in FIG. 3, description of the image capturing section 20, the IF section 21, the IF section 22, the main image processor 23, the recognition image processor 24, and the recognition section 25, denoted by the same reference numerals as those in FIG. 2, is omitted.

Figure 3:
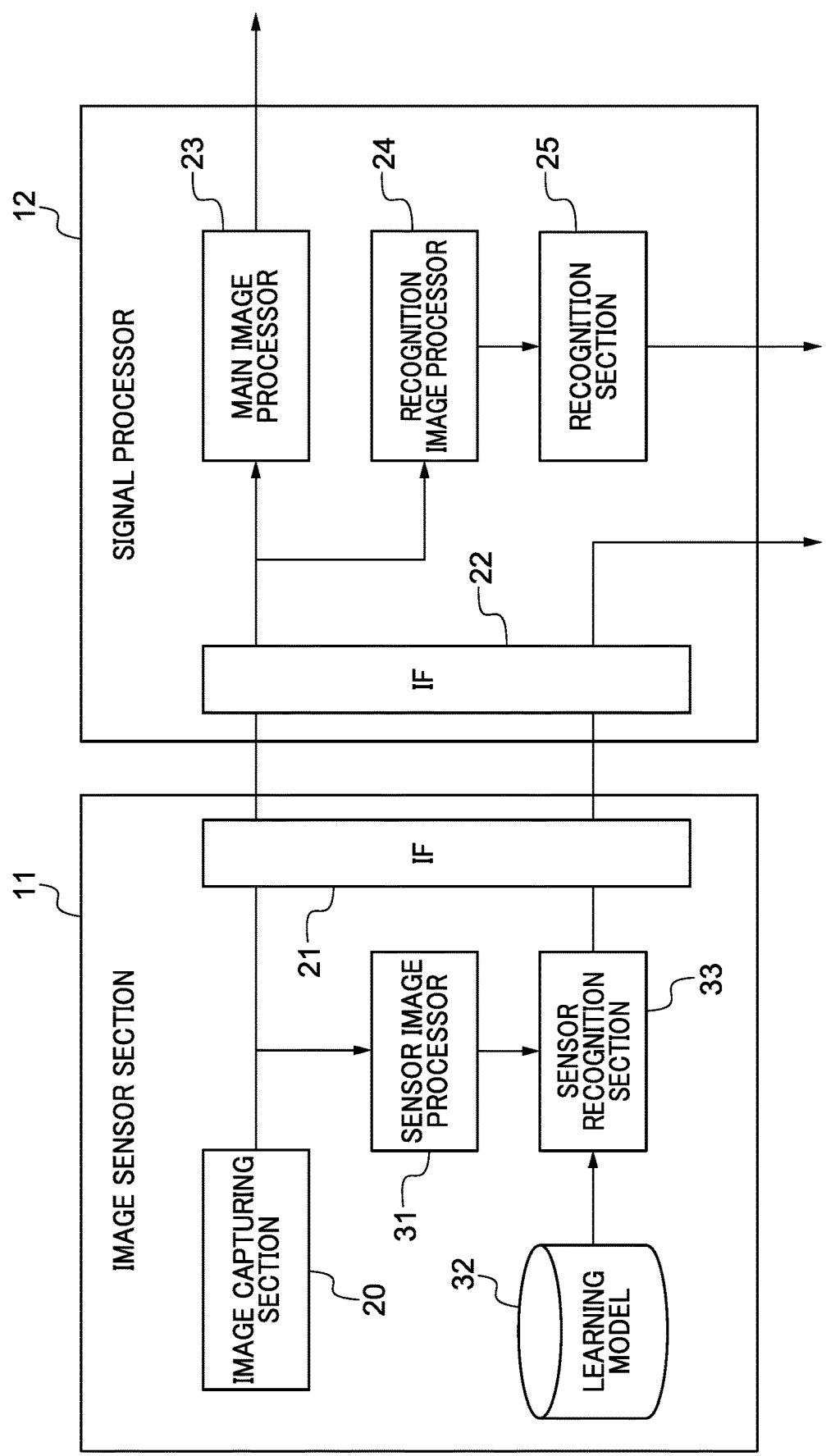
FIG. 3 is a diagram showing a data flow inside an image sensor section and a signal processor in a recognition mode in the first embodiment of the present invention.

As shown in FIG. 3, the image sensor section 11 is further provided with a sensor image processor 31 and a sensor recognition section 33. That is, in the present embodiment, the digital camera 100 has two recognition sections, i.e. the sensor recognition section 33 in the image sensor section 11 and the recognition section 25 in the signal processor 12.

A difference between the sensor recognition section 33 and the recognition section 25 will be described with reference to FIG. 4. The sensor recognition section 33 (first recognition unit) as the recognition section disposed in the image sensor section 11 is simpler in image processing performed immediately before recognition processing, and is smaller in the scale of a circuit for recognition than the recognition section 25 as the recognition section disposed in the signal processor 12. Therefore, the sensor recognition section 33 is lower in recognition performance than the recognition section 25. On the other hand, in the image sensor section 11, it is possible to perform recognition by first reading out only lines necessary for recognition, and output a result of the recognition in the middle of the image, and hence the sensor recognition section 33 can perform recognition using a thinned image or a partial image without using the whole image. Therefore, time taken to obtain a recognition result by the sensor recognition section 33 is shorter than time taken to obtain a recognition result by the recognition section 25. Further, it is possible to output the recognition result obtained by the sensor recognition section 33 simultaneously with the whole image output from the image sensor section 11 to the outside without delay. Further, the sensor recognition section 33 can perform recognition not using the whole image but using a partial image differently from the recognition section 25, and perform recognition processing using the circuit having a scale smaller than that of the recognition section 25, and hence it is possible to make power consumption smaller than the recognition section 25. Further, the recognition section 25 and the sensor recognition section 33 have their respective circuits disposed at different locations, i.e. on the image sensor section 11 and the signal processor 12, and there is a characteristic difference in portions where heat is generated when recognition processing is performed. When the image sensor section 11 and the signal processor 12 each separately have a recognition section, it is possible to make proper selective use of the respective recognition sections by making use of the characteristic features of them. For example, it is possible to provide a parallel recognition mode in which the sensor recognition section 33 and the recognition section 25 are simultaneously used in parallel by setting different recognition targets for the sensor recognition section 33 and the recognition section 25, respectively. Further, the recognition section 25 may be used when importance is placed on the recognition performance, and the sensor recognition section 33 may be used when importance is placed on lag of the recognition result. The recognition section 25 of the signal processor 12 may be used when it is desired to suppress heat generation in the image sensor section 11, and the sensor recognition section 33 may be used when it is desired to suppress power consumption of the whole digital camera 100. Thus, a variety of methods are envisaged for the proper use of the recognition section 25 and the sensor recognition section 33, but in the present embodiment, the method is not limited to a specific one.

Referring again to FIG. 3, when an image signal output from the image capturing section 20 is input to the sensor image processor 31, the sensor image processor 31 performs image processing for converting the received image signal to an image in a format which enables the sensor recognition section 33 to operate the recognition function. More specifically, the image output from the image capturing section 20 is a RAW image, and hence the sensor image processor 31 performs image processing for converting the RAW image to a YUV image and performing gamma conversion. Although the image processing performed by the sensor image processor 31 is basically the same as the image processing performed by the recognition image processor 24 in the signal processor 12, the scale of a circuit which can be disposed in the image sensor section 11 is limited, and hence the image processing performed by the sensor image processor 32 is limited to image processing simpler than that of the recognition image processor 24. Then, the image output from the sensor image processor 31 is input to the sensor recognition section 33. The sensor recognition section 33 performs the recognition processing based on a learning model 32 (first learning model) placed in a memory (not shown) disposed in the image sensor section 11. The recognition processing performed by the sensor recognition section 32 is similar to that performed by the recognition section 25 of the signal processor 12 and is not particularly limited. Further, the memory storing the learning model 32 may be a nonvolatile memory, or may be a volatile memory into which data is loaded from a nonvolatile memory at the start of energization of the signal processor 12 and which holds the data during the energization time. The sensor recognition section 33 performs the recognition processing, and a recognition result is output to the control arithmetic unit 16 via the IF sections 21 and 22. Although n FIG. 3, the recognition result is output to the control arithmetic unit 16 via the signal processor 12, there is no problem even when the recognition result is directly output to the control arithmetic unit 16 via the IF section 21.

Figure 5:
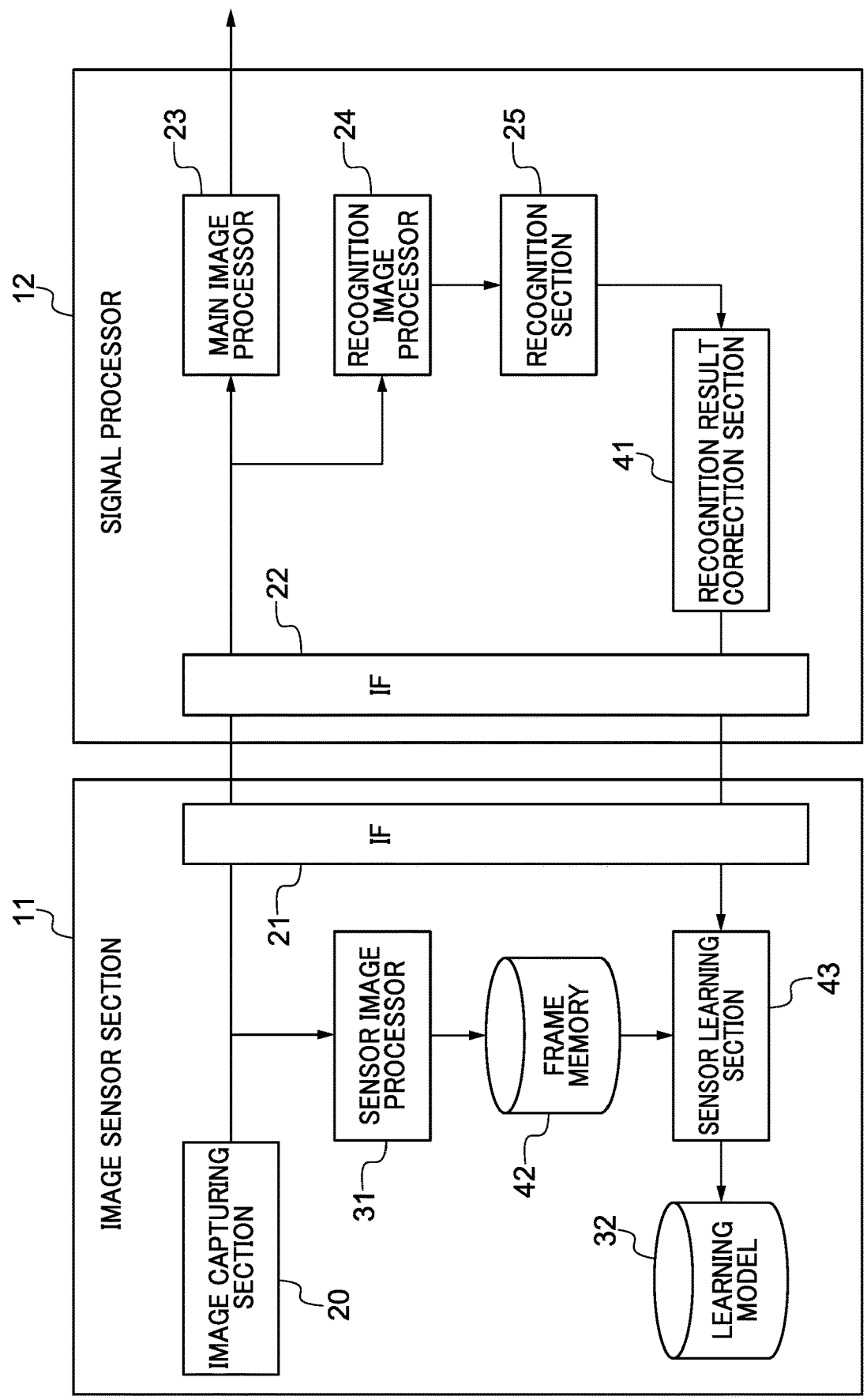
FIG. 5 is a diagram showing a data flow inside the image sensor section and the signal processor in a learning mode in the first embodiment of the present invention.

Next, the learning mode will be described using data inside the image sensor section 11 and the signal processor 12 appearing in FIG. 5. As described above, the sensor image processor 31 cannot perform complicated image processing, i.e. processing requiring a large number of taps, such as geometrical deformation for correcting distortion aberration, because of its circuit scale. On the other hand, even when the circuit scale of the image sensor section 11 is increased, in the geometrical deformation, a corrected image cannot be generated unless pixels of the image, corresponding to a required number of taps, are read out, and hence a time lag is generated between inputting of the image to the sensor image processor 31 and outputting of the image from the sensor image processor 31. Therefore, when it is desired to use a recognition result obtained by the sensor recognition section 33 without a time lag, it is impossible to perform geometrical deformation generating the above-mentioned time lag by the sensor image processor 31. On the other hand, if the sensor recognition section 33 performs recognition on an image which has not been subjected to geometrical deformation by the sensor image processor 31 and remains distorted, the recognition accuracy is lowered. For example, in a case where an object is recognized from an image, it is general that a form of the object is extracted as a feature and is learned by the learning model 32. However, in a case where an image has large distortion aberration caused by the lens group 10, the form of the object is broken as the image extends closer to the periphery, and the image of the broken form is input to the sensor recognition section 33, so that the recognition accuracy of the sensor recognition section 33 is lowered. On the other hand, in the signal processor 12, an image on which geometrical deformation has been performed by the recognition image processor 24 with high accuracy is generated and input to the recognition section 25. That is, the recognition section 25 can perform recognition processing based on the image which preserves the form of an actual object even in the periphery. In the present embodiment, the learning model 32 of the image sensor section 11 is relearned by using a result obtained by performing recognition processing by the recognition section 25 of the signal processor 12 with high accuracy, as correct answer data. This makes it possible to improve the recognition accuracy when the sensor recognition section 33 is used in the recognition mode.

The specific internal operations of the image sensor section 11 and the signal processor 12 in the learning mode will be described with reference to FIG. 5. Note that in the learning mode, the signal processor 12 further includes a recognition result correction section 41 in addition to the components in the recognition mode, appearing in FIG. 3.

A recognition result obtained by the recognition section 25 is returned to the image sensor section 11 via the recognition result correction section 41. Since geometrical deformation processing for correcting distortion is not performed on the image by the sensor image processor 31 as described above, the sensor recognition section 33 performs recognition processing directly using the image having large distortion aberration caused by the lens group 10 as it is. To cope with this, the recognition result correction section 41 (correction unit) performs correction for restoring, out of the recognition results obtained by the recognition image processor 24, a recognition result associated with each position within an image, to a state before the geometrical deformation. That is, the recognition result correction section 41 performs inverse conversion of geometrical deformation and outputs the processed recognition result to a sensor learning section 43 via the IF sections 22 and 21. This makes it possible to obtain a recognition result by applying the recognition result obtained from the image geometrically deformed, to the image before being geometrically deformed.

Next, the processing performed in the image sensor section 11 will be described. Image processing not including geometrical deformation is performed by the sensor image processor 31, and the processed image is stored in a frame memory 42. The frame memory 42 (synchronization unit) is used to input an image output from the sensor image processor 31 to the sensor learning section 43 in a state synchronized and associated with an image used by the recognition section 25 to obtain the recognition result, such that these images are relevant to each other. Therefore, the frame memory 42 stores (holds) images of a plurality of frames sequentially input thereto which are formed by performing image processing on the images output from the image capturing section 20 by the sensor image processor 31. Here, the geometrical deformation processing needs to read out a number of pixels of the image, corresponding to a number of taps necessary for the processing, and hence a time lag is generated between image inputting and image outputting as described above, and the recognition image processor 24 that outputs an image to be used by the recognition section 25 performs the geometrical deformation processing. Therefore, a lag of several frames (frame lag) is generated in an output of a recognition result which is output from the recognition section 25 and corrected by the recognition result correction 41 with respect to an output of an image from the sensor image processor 31. As a result, if the sensor learning section 43 performs learning on an image directly input from the sensor recognition section 31 using a recognition result corrected by the recognition result correction section 41, there arises a problem that the input image and the corrected recognition result do not correspond to each other. If it is assumed, for example, to perform a learning operation for continuously photographing with a fixed angle of view, there is no problem even when a lag of some frames is generated, but in a case where learning gradually progresses while the digital camera 100 is being normally used, i.e. while photographing is being performed while changing the angle of view, the lag brings about a serious problem. To prevent this, in the present embodiment, the sensor learning section 43 reads out an image of a frame input to the frame memory 42 at a timing earlier than the current frame by the number of frames corresponding to the time lag, from the frame memory 42. Note that here, the current frame refers to a frame which is currently input from the sensor image processor 31 to the frame memory 42. This makes it possible to prevent generation of the above-mentioned problem caused by the frame lag and solve mismatch between an image input to the sensor learning section 43 and a recognition result corrected by the recognition result correction section 41 and used for learning of the sensor learning section 43. Note that the above-mentioned frame lag can be generated not only by the geometrical deformation processing performed by the recognition image processor 24, but also by other processing performed in the signal processor 12, and hence a total number of lag frames generated by the entire processing operations performed in the signal processor 12 is taken into account. With this, when the learning operation is performed, even in a case where photographing is not continuously performed with a fixed angle of view, but the digital camera 100 is normally used, it is possible to cause the learning to progress without any problems. The sensor learning section 43 (learning unit) performs learning on an image read out from the frame memory 42 using a recognition result input from the recognition result correction section 41 as teacher data. Therefore, it is possible to update the learning model 32 such that the learning model 32 achieves a recognition accuracy of the same level as a recognition accuracy achieved on an image subjected to geometrical deformation processing.

Note that the sensor learning section 43 can operate as part of the sensor recognition section 33 or can be realized as a totally separate circuit from the sensor recognition section 33. Further, as the learning method, any other method may be employed insofar as it is a method making it possible to update the learning model 32 which can be used by the sensor recognition section 33. For example, a method of updating weights of pooling layers of a neural network using e.g. a maximum likelihood estimation method, a k-means clustering method, or an evaluation function may be used. By thus using the learning mode, it is possible to improve the recognition performance of an image captured by the image sensor section 11 while normally using the digital camera 100.

Next, a mode switching process for switching between the recognition mode and the learning mode will be described with reference to FIG. 6.

Figure 6:
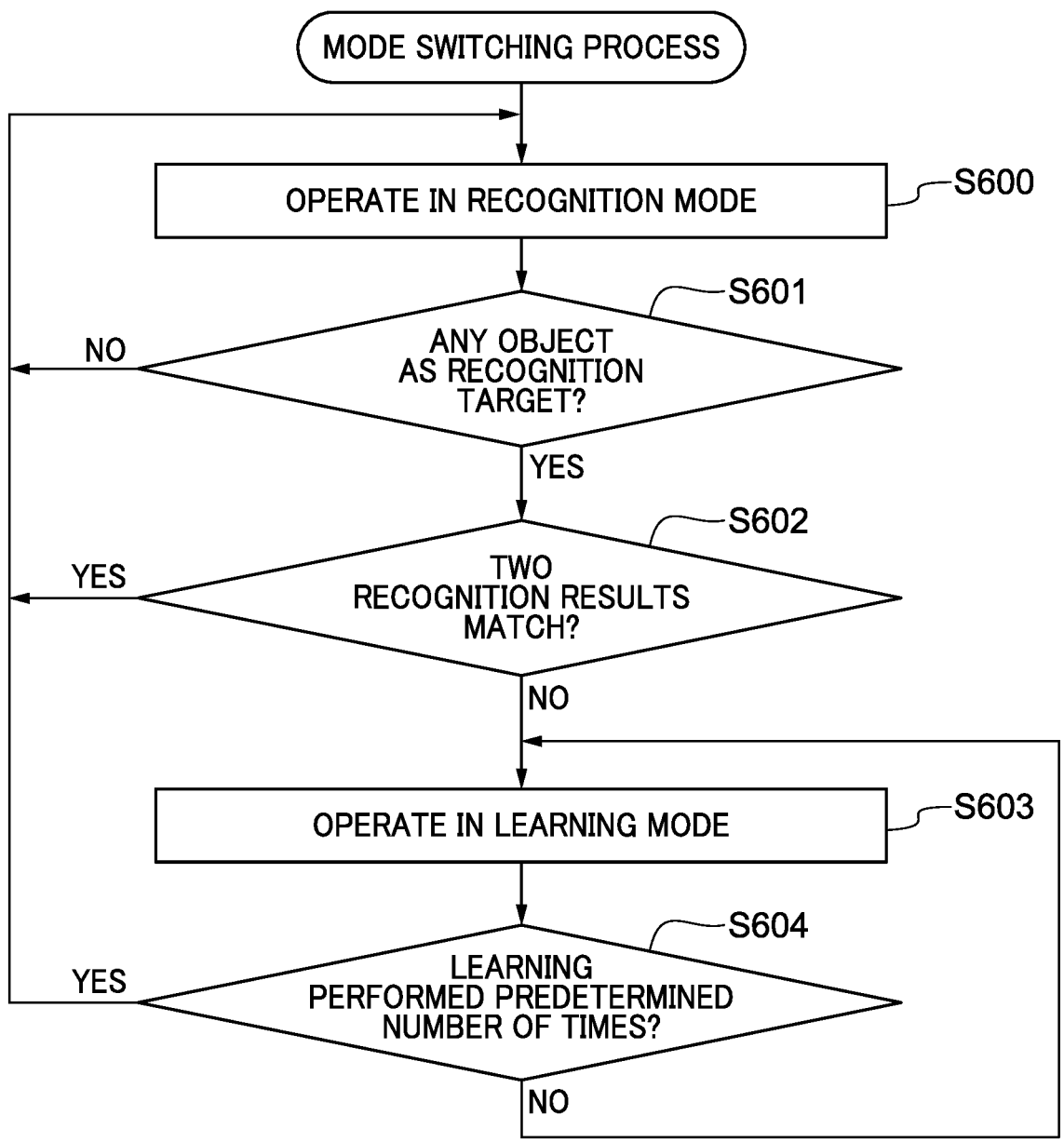
FIG. 6 is a flowchart of a mode switching process according to the first embodiment of the present invention.

FIG. 6 is a flowchart of the mode switching process according to the present embodiment. The present process is executed by the control arithmetic unit 16 (switching unit) that loads a program stored in a ROM (not shown) disposed in the digital camera 100 into a RAM (not shown) similarly disposed in the digital camera 100. The present process is started when the digital camera 100 is started up.

First, when the camera is started, the operation is started in the recognition mode (step S600). The control arithmetic unit 16 determines, while causing the digital camera 100 to operate in the recognition mode, whether or not there is any object as a recognition target of the sensor recognition section 33 and the recognition section 25, in a sequentially captured image (step S601). If there is no object as a recognition target (NO to the step S601), the process returns to the step S600, and the recognition mode is continued. On the other hand, if there is an object as a recognition target (YES to the step S601), the process proceeds to a step S602.

In the step S602, the control arithmetic unit 16 determines whether or not a recognition result obtained by the sensor recognition section 33 and a recognition result obtained by the recognition section 25 of the signal processor 12 match each other. So long as the recognition result obtained by the sensor recognition section 33 and the recognition result obtained by the recognition section 25 of the signal processor 12 match each other (YES to the step S602), the process returns to the step S600, and the recognition mode is continued. On the other hand, if there is a mismatch between the recognition results (NO to the step S602), to improve the recognition accuracy in the image sensor section 11, the image sensor section 11 is switched to the learning mode and the operation in the learning mode is started (step S603).

After that, the sensor learning section 43 repeats learning in the learning mode, and the control arithmetic unit 16 determines whether or not learning satisfying a predetermined condition has ended (step S604). In the present embodiment, specifically, if the sensor learning section 43 has performed learning a predetermined number of times, it is determined that the learning satisfying the predetermined condition has ended (YES to the step S604), so that the process returns to the step S600 to continue the operation in the recognition mode is resumed (step S604). On the other hand, if it is determined that the learning satisfying the predetermined condition has not ended (NO to the step S604), the process returns to the step S603 to continue the learning mode.

In the present embodiment, as an example of the determination in the step S604, in a case where learning has been performed the predetermined number of times, it is determined that the learning satisfying the predetermined condition has ended, but this is not limitative. For example, the mode may be shifted to the recognition mode at a predetermined frequency during intervals of learning to check the recognition accuracy with respect to a recognition target, whereby when a predetermined recognition accuracy is acquired, it may be determined that the learning satisfying the predetermined condition has ended.

Further, although the determination on match/mismatch between the recognition results in the step S602 is performed on one frame image in the present embodiment, this is not limitative. For example, the determination in the step S602 may be sequentially performed on frame images, and in a case where a mismatch is detected a predetermined number of times, or a case where a ratio of a mismatch becomes not lower than a predetermined value, it may be determined that a mismatch has occurred between the recognition results.

Figure 7:
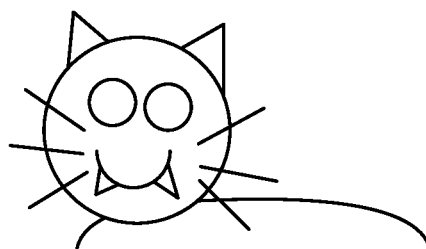
FIG. 7 is a diagram showing an example of a user interface for prompting a user to shift the mode to the learning mode in the first embodiment of the present invention.

Further, although the mode switching process in which the digital camera 100 is automatically switched between the recognition mode and the learning mode has been described with reference to FIG. 6, this is not limitative. For example, if it is determined that the answer to the question of the step S602 is negative (NO), a user interface screen shown in FIG. 7 for prompting a user to shift the mode to the learning mode may be displayed on the display section integrally formed with the operation section 15, whereby the recognition mode may be shifted to the learning mode when the user selects "Yes" on the user interface screen shown in FIG. 7 on the operation section 15.

Next, a second embodiment of the present invention will be described. There is no difference between the internal configuration of a digital camera according to the present embodiment and that in the first embodiment, and hence the same components as those described with reference to FIGS. 1 to 6 are denoted by the same reference numerals, and redundant description is omitted.

In the present embodiment, a description will be given of a case where the storage capacity is limited due to the limited circuit scale of the image sensor section 11 so that a lot of learning models cannot be stored. That is, although the image sensor section 11 can store several learning models, the number of objects as recognition targets is less than that of the recognition section of the signal processor 12, and as an extreme example, there is a case where only one type of the learning model can be stored. In a case where an object desired to be recognized does not exist in the learning model 32 in the image sensor section 11, it is necessary to operate the digital camera 100 in the learning mode and build the learning model 32 from the beginning for the object desired to be recognized by using recognition results obtained by the recognition section 25 as teacher data. Note that the operations in the image sensor section 11 and the signal processor 12 performed when operated in the learning mode are the same as those in the first embodiment, and hence detailed description thereof is omitted.

A mode switching process for switching between the recognition mode and the learning mode, according to the present embodiment, which is different from that of the first embodiment described with reference to FIG. 6, will be described with reference to FIG. 8.

Figure 8:
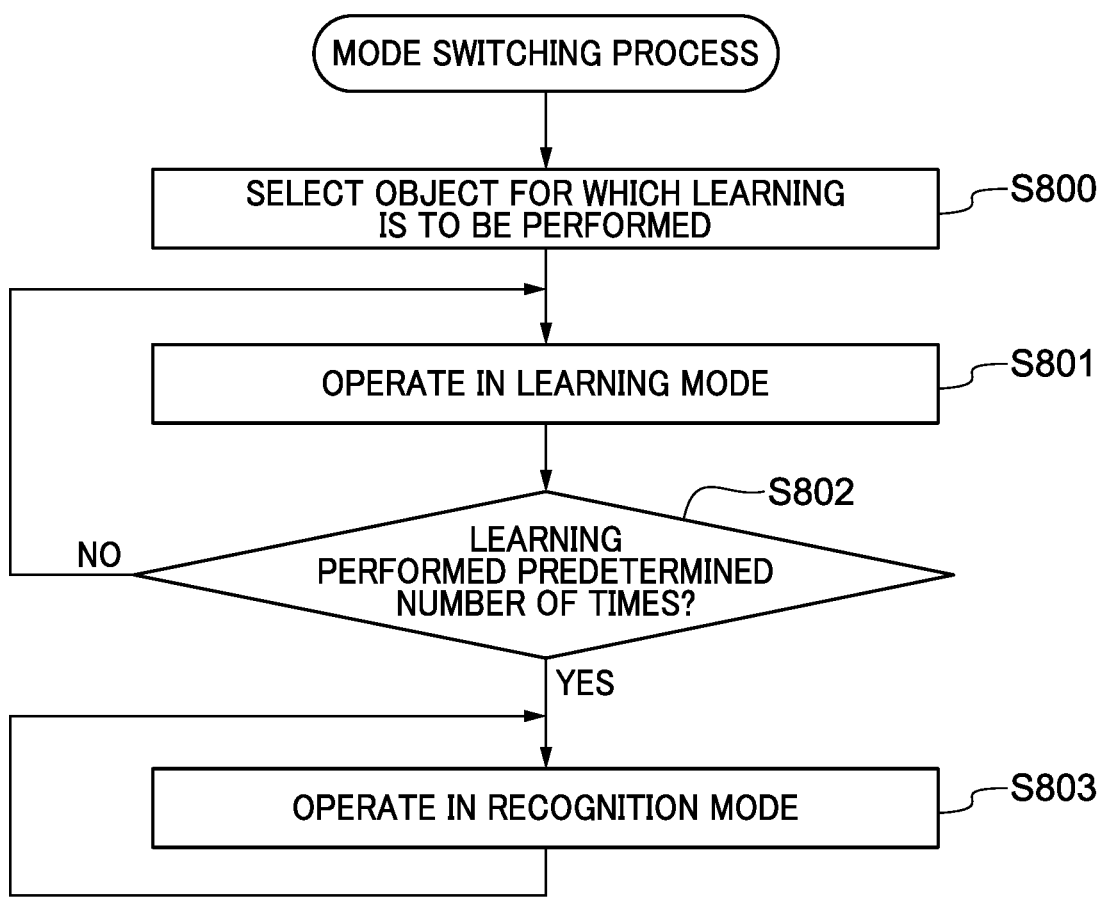
FIG. 8 is a flowchart of a mode switching process according to a second embodiment of the present invention.

FIG. 8 is a flowchart of the mode switching process according to the present embodiment. The present process is executed by the control arithmetic unit 16 (switching unit) that loads a program stored in the ROM (not shown) disposed in the digital camera 100 into the RAM (not shown) similarly disposed in the digital camera 100. The present process is started when the digital camera 100 is started up.

Figure 9:
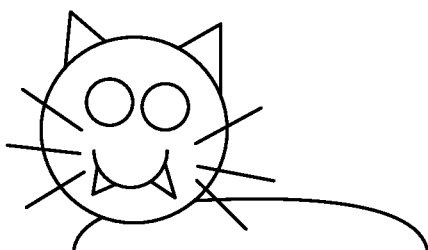
FIG. 9 is a diagram showing an example of a user interface screen for prompting a user to select an object desired to be added as a recognition target of the image sensor section when the camera is started up, in the second embodiment of the present invention.

First, when the camera is started, a user interface screen shown in FIG. 9 is displayed on the display section integrally formed with the operation section 15 to prompt a user to select an object desired to be added as a recognition target of the image sensor section 11 (step S800). Note that the user interface screen displayed in the step S800 is not limited to the user interface screen shown in FIG. 9. For example, a user interface screen that displays specific choices may be used or a user interface screen that displays an object recognized by the recognition section 25 from a live view image may be used.

Next, the operation of the image sensor section 11 is started in the learning mode to build the learning model 32 for recognizing the object selected in the step S800 (step S801).

After that, the sensor learning section 43 repeats learning in the learning mode, and the control arithmetic unit 16 determines whether or not the learning satisfying a predetermined condition has ended (step S802). In the present embodiment, specifically, if learning has been performed on the object selected in the step S800 a predetermined number of times by the sensor learning section 43, it is determined that the learning satisfying the predetermined condition has ended (YES to the step S802), so that the process terminates the learning and proceeds to a step S803. On the other hand, if it is determined that the learning satisfying the predetermined condition has not ended (NO to the step S802), the process returns to the step S801 to continue the learning mode.

In the step S803, the operation in the recognition mode is started.

According to the process in FIG. 8, it is possible to newly add an object which is not recognized by the recognition function of the image sensor section 11 as a recognition target, by using the recognition function of the signal processor 12. Note that the memory storing the learning model 32 built as described above may be a nonvolatile memory preserving stored data even after the digital camera 100 is powered off, or a volatile memory from which stored data is erased when the digital camera 100 is powered off. In the latter case, after the digital camera 100 is powered on, relearning of the learning model 32 is performed anew.

Further, in the present embodiment, as an example of the determination in the step S802, in a case where learning has been performed the predetermined number of times, it is determined that the learning satisfying the predetermined condition has ended, whereby the learning mode is shifted to the recognition mode, but this is not limitative. For example, such a user interface screen as shown in FIG. 9 may be displayed to prompt a user to select whether or not to shift to the recognition mode. Further, the mode may be shifted to the recognition mode when a predetermined time period elapses after the start of the learning in the step S801. Further, the learning mode may be shifted to the recognition mode at a predetermined frequency during intervals of learning to check the recognition accuracy with respect to a recognition target, whereby when a predetermined recognition accuracy is acquired, the learning mode may be shifted to the recognition mode.

As described above, although in the first and second embodiments, the digital camera 100 integrally formed with the lens group 10 has been described as the image capturing apparatus according to the present invention by way of example, this is not limitative. For example, there is no problem even when the lens group 10 is a separate device which can be removably attached to the body of the digital camera 100. Further, the digital camera 100 may be implemented in another form, such as a smartphone having functions other than the camera.

The present invention has been described heretofore based on the embodiments thereof. However, the present invention is not limited to these embodiments, but it is to be understood that the invention includes a variety of forms within the scope of the gist of the invention. Further, it is possible to partially combine the embodiments on an as-needed basis.

The present invention includes a case where a program of software that realizes the functions of the above-described embodiments is supplied to a system or an apparatus having a computer that can execute the program, directly from a recording medium or using wired/wireless communication, and the system or the apparatus executes the program.

Therefore, a program code itself supplied to and installed in the computer to realize the functional processing of the present invention on the computer also realizes the present invention. That is, the computer program itself for realizing the functional processing of the present invention is also included in the present invention.

In this case, the program is not limited to a particular form, but insofar as it has a function of a program, it may be in any form, including an object code, a program executed by an interpreter, and script data supplied to an OS.

A recording medium for supplying the program may be e.g. a hard disk, a magnetic recording medium, such as a magnetic tape, an optical/magnetooptical storage medium, or a nonvolatile semiconductor memory.

Further, as a method of supplying the program, a method is envisaged in which the computer program implementing the present invention is stored in a server on a computer network, and a client computer connected to the server downloads and executes the computer program.

Note that in the present embodiment, the present invention can also be realized by supplying a program that realizes one or more functions to a system or a computer of an apparatus, and the system or a system controller of the apparatus performing a process for loading and executing the program. The system controller may have one or a plurality of processors or circuits, and may include a network of a plurality of separated system controllers or a plurality of separated processors or circuits, to load and execute an executable command.

The processor or circuit can include a central processing unit (CPU), a micro processing unit (MPU), a graphics processing unit (GPU), an application-specific integrated circuit (ASIC), and a field programmable gate array (FPGA). Further, the processor or circuit can include a digital signal processor (DSP), a data flow processor (DFP), or a neural processing unit (NPU).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-065203 filed Apr. 11, 2022, which is hereby incorporated by reference herein in its entirety.

What is claimed is:

1. An image capturing apparatus including an image sensor section and a signal processor configured to process an image input from the image sensor section via a signal line, comprising:
a switching unit configured to switch the image sensor section to one of a recognition mode and a learning mode,
wherein the image sensor section includes:
an image capturing unit configured to generate the image, and
a first recognition unit configured to perform, in the recognition mode, recognition processing by inputting the image to a first learning model,
wherein the signal processor includes:
a second recognition unit configured to perform recognition processing by inputting the image to a second learning model, and
wherein the image sensor section further includes a learning unit configured to update, in the learning mode, the first learning model, based on a recognition result which is obtained by the second recognition unit and is input from the signal processor, and an image generated by the image capturing unit.

2. The image capturing apparatus according to claim 1, further comprising a synchronization unit, provided in the image sensor section, which is configured to enable, in the learning mode, the image input from the image capturing unit and an image used by the second recognition unit to obtain the recognition result, to be input to the learning unit, in a state synchronized and associated with each other such that these images are relevant to each other.

3. The image capturing apparatus according to claim 2, wherein the synchronization unit holds a plurality of frames sequentially input from the image sensor section, and inputs an image of a frame input to the synchronization unit at a timing earlier than an image of a frame currently input to the synchronization unit, by the number of frames corresponding to a lag generated by processing in the signal processor, to the learning unit, in synchronism with the recognition result obtained by the second recognition unit.

4. The image capturing apparatus according to claim 1, wherein the signal processor further includes an image modification unit configured to process the image input from the image sensor section, and
wherein the signal processor inputs an image processed by the image modification unit to the second recognition unit.

5. The image capturing apparatus according to claim 4, wherein the image modification unit performs, on the image input from the image sensor section, at least one image processing out of demosaicing processing, development processing, brightness correction processing, color correction processing, edge emphasizing processing, contrast correction processing, geometrical deformation processing, aberration correction processing, processing for correcting decreased marginal illumination due to vignetting, and gamma correction processing.

6. The image capturing apparatus according to claim 5, wherein the signal processor further includes a correction unit configured to perform correction of a recognition result obtained by the second recognition unit, and
wherein when the image sensor section is in the learning mode, the recognition result is input to the learning unit after being corrected by the correction unit.

7. The image capturing apparatus according to claim 6, wherein the correction unit is inverse conversion of image processing performed by the image modification unit.

8. The image capturing apparatus according to claim 7, wherein the correction unit is inverse conversion of geometrical deformation processing performed by the image modification unit.

9. The image capturing apparatus according to claim 1, wherein the first recognition unit is smaller in at least one of a circuit scale, power consumption, and the number of taps, than the second recognition unit.

10. The image capturing apparatus according to claim 1, wherein the switching unit has a parallel recognition mode for causing the second recognition unit of the signal processor to output a recognition result of a recognition target different from a recognition target of the first recognition unit, in parallel with causing the image sensor unit to operate in the recognition mode.

11. The image capturing apparatus according to claim 1, wherein recognition processing performed by the first recognition unit and the second recognition unit includes at least one of object recognition, scene recognition, class classification of an object, and image classification.

12. The image capturing apparatus according to claim 1, wherein the switching unit switches the image sensor section from the recognition mode to the learning mode in a case where respective recognition targets of the first recognition unit and the second recognition unit are included in the image input from the image capturing unit but a mismatch occurs between recognition results obtained by the first and second recognition units, respectively.

13. The image capturing apparatus according to claim 12, wherein the switching unit displays a user interface screen for prompting a user to switch the image sensor section from the recognition mode to the learning mode, in a case where the mismatch occurs.

14. The image capturing apparatus according to claim 1, wherein in a case where an object desired to be added as a recognition target of the second recognition unit is selected by a user, the switching unit causes the learning unit to perform learning for recognizing the selected object in the learning mode.

15. The image capturing apparatus according to claim 14, wherein when the image capturing apparatus is started up, the switching unit displays a user interface screen for prompting a user to select an object desired to be added as a recognition target of the second recognition unit.

16. A method of controlling an image capturing apparatus including an image sensor section and a signal processor configured to process an image input from the image sensor section via a signal line, comprising:

switching the image sensor section to one of a recognition mode and a learning mode;
   generating the image in the image sensor section;
   performing recognition processing in the image sensor section in the recognition mode by inputting the image to a first learning model;
   performing recognition processing in the signal processor by inputting the image to a second learning model; and
   updating, in the image sensor section in the learning mode, the first learning model based on a recognition result obtained by inputting the image input from the signal processor to the second learning model, and an image generated by the image sensor section.

17. A non-transitory computer-readable storage medium storing a program for causing a computer to execute a method of controlling an image capturing apparatus including an image sensor section and a signal processor configured to process an image input from the image sensor section via a signal line, wherein the method comprises:
   switching the image sensor section to one of a recognition mode and a learning mode;
   generating the image in the image sensor section;
   performing recognition processing in the image sensor section in the recognition mode by inputting the image to a first learning model;
   performing recognition processing in the signal processor by inputting the image to a second learning model; and
   updating, in the image sensor section in the learning mode, the first learning model based on a recognition result obtained by inputting the image input from the signal processor to the second learning model, and an image generated by the image sensor section.

* * * * *